(12) United States Patent
Miller

(10) Patent No.: US 7,521,078 B2
(45) Date of Patent: Apr. 21, 2009

(54) PUFFED CHEESE PRODUCT AND PROCESS FOR MAKING SAME

(75) Inventor: Miranda Miller, Arlington Heights, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 811 days.

(21) Appl. No.: 10/966,093

(22) Filed: Oct. 15, 2004

(65) Prior Publication Data

US 2006/0083842 A1    Apr. 20, 2006

(51) Int. Cl.
*A23C 19/00* (2006.01)

(52) U.S. Cl. ............... 426/582; 426/580; 426/443; 426/445

(58) Field of Classification Search ............ 426/443, 426/445, 580, 582
See application file for complete search history.

(56) References Cited

U.S. PATENT DOCUMENTS

| | | | |
|---|---|---|---|
| 4,517,204 A | 5/1985 | Mottur et al. | |
| 4,803,090 A | 2/1989 | Schlipalius et al. | |
| 4,997,670 A | 3/1991 | Kielsmeier et al. | |
| 5,356,643 A | 10/1994 | Miller et al. | |
| 5,626,893 A | 5/1997 | Reddy | |
| 5,795,613 A | 8/1998 | Scharfmann et al. | |
| 5,876,770 A | 3/1999 | Zaikos et al. | |
| 5,980,962 A | 11/1999 | Bracken et al. | |
| 6,645,541 B2 | 11/2003 | Morii et al. | |
| 6,669,978 B2 | 12/2003 | Laye et al. | |
| 2004/0028784 A1 | 2/2004 | Van Beirendonck | |

FOREIGN PATENT DOCUMENTS

| | | |
|---|---|---|
| EP | 0680698 A1 | 11/1995 |
| FR | 2750015 A1 | 12/1997 |
| WO | WO-03/061394 A1 | 7/2003 |
| WO | WO-2006/044461 A1 | 4/2006 |

OTHER PUBLICATIONS

PCT Written Opinion of the International Searching Authority, Int'l Appln. No. PCT/US2005/036681, Feb. 14, 2006, 6 pages total.
Hoen, F., "Innovative products with a natural taste. Puffed foods made by the microwave-vacuum process," Abstract, FROSTI Database, Accession No. 533770, Source: Zucker und Susswaren-Wirtschaft, Aug. 2000, 53 (7-8), 207-208, input date: Oct. 6, 2000.
Langer, G., "Microwave vacuum drying enhances quality," Abstract, FROSTI Database, Accession No. 539004, Source: Lebensmitteltechnik, Oct. 2000, 31 (10), 53-54, input date: Dec. 5, 2000.
Hoen, F., "Innovative drying method for high-quality dehydrated food," Abstract, FROSTI Database, Accession No. 2003-08-Ea0421, Source: Food Marketing & Technology, 2003, 17 (2), 27-30.
Yoshinori, T., "Method For Puffing Cheese and Apparatus Therefor," Patent Abstracts of Japan, Publication No. 01291748 A, Nov. 24, 1989, 1 page, JPO&Japio.
Masanori, T., "Production of Cheese Snack," Patent Abstracts of Japan, Publication No. 02039849 A, Feb. 8, 1990, 1 page, JPO &Japio.
Tetsuo, M., "Puffed Food," Patent Abstracts of Japan, Publication No. 03147752 A, Jun. 24, 1991, 1 page, JPO&Japio.
Hiroshi, S., "Cheese Product and Production Thereof," Patent Abstracts of Japan, Publication No. 04011836 A, Jan. 16, 1992, 1 page, JPO&Japio.
Kiichiro, A., "Dried Cheese and Its Production," Patent Abstracts of Japan, Publication No. 05276865 A, Oct. 26, 1993, 1 page, JPO &Japio.
Toshihiko, N., "Production of Puff Snack," Patent Abstracts of Japan, Publication No. 07095860 A, Apr. 11, 1995, 1 page, JPO&Japio.

*Primary Examiner*—Leslie Wong
(74) *Attorney, Agent, or Firm*—Fitch, Even, Tabin & Flannery

(57) ABSTRACT

A dried, crisp, puffed cheese food product and a process for making it is provided wherein surfaces of low fat cheese precursor pieces containing about 12 to about 24 percent moisture are contacted with polysaccharide, followed by tempering the coated pieces by holding them in a moisture-tight environment, prior to puffing the pieces into a shelf-stable savory crispy puffed cheese product. The resulting snack food product comprises puffed cheese pieces having generally uniform expanded structures free of large voids and which do not stick tightly or clump to each other.

19 Claims, 1 Drawing Sheet

PUFFED CHEESE PRODUCT AND PROCESS FOR MAKING SAME

FIELD OF THE INVENTION

This invention relates to snack food products, particularly snack food products containing and/or prepared from cheese, and processes for making them.

BACKGROUND OF THE INVENTION

Nutritious snack foods which are low in carbohydrates and/or fat while maintaining pleasant organoleptic characteristics (e.g., flavor, aroma, texture, appearance, and so forth) are in demand by many consumers. Cheese is a flavorful milk-based product that is an excellent source of calcium, protein, and other nutrients and is naturally low in carbohydrates.

Dried cheese-based products having a thin, crunchy texture have been sought in the past. For instance, U.S. Pat. No. 4,803,090 describes a process for producing a microwave puffed cheese snack in which hot viscous drops of cheese base material or processed cheese or slices or diced natural cheese, cheese base material, or process cheese are formed into pieces to provide cheese precursor pieces having a fat content in the range of 0-70 percent, particularly 17-34 percent, and a moisture content of 20-50 percent. The precursor pieces are baked in a convection oven, and simultaneously or subsequent to baking, are subjected to a microwave cooking and drying step to puff the pieces without oiling off. The moisture content of the cooked, dried puffed product is less than 5 percent of that of the starting precursor pieces.

International Publication No. WO03061394A1 describes a method for preparing cheese products, in which cheese is subjected to a heat treatment, involving separating cheese parts having main dimensions between 1 and 10 mm from a solid cheese having a fat content of at least 30 percent and subjecting the cheese parts to a microwave treatment so as to form an airy cheese product. The cheese parts may be subjected to a drying step (forced air drying at less than 20° C. for 3-7 hr) between the separating and microwave treatment steps.

French Patent 2,750,015A1 describes a process for manufacture of a dried puffed cheese product where a cheese material having an initial moisture of 25-65 percent, is expansion dried using microwave energy to final moisture content of less than 10 percent. The starting cheese material is described as "pop-corn" type product from cheese curds made from whole milk, flavored cheese curds, cheese curds made from skim milk, or thin slices of cheese (1 mm thick).

Japanese Patent Publication 03-147752 describes a puffed food in which moisture is added to a substance containing protein as a main ingredient and a gelatinized grain flour, and puffing the mixture by microwave heating. The substance containing protein may be cheese, powdered milk, or dried egg white powder, and the gelatinized grain flour may be glutinous rice or waxy corn starch having amylopectin content, so that total moisture content in the raw material may be preferably 20-80 percent. The mixture is kneaded and rolled into, for example, a 3-10 mm thickness and cut into a proper size; the dough is then heated in a microwave oven to form a puffed and dried food.

Coating agents have been applied to cheeses in the past for various purposes. For instance, U.S. Pat. No. 5,876,770 describes a process and formulation for improved texture and melt of reduced-fat cheese products. This patent describes a hydrophobic material (viz., a fat or oil) used to prevent sticking in cheese.

U.S. Pat. No. 5,626,893 describes an anticaking agent used for reducing the stickiness of diced or shredded cheese products. The anticaking agent comprises fine mesh vegetable flour, bentonite, cellulose, and antimycotic agents or bacterial cultures. This patent is not concerned with drying of the cheese pieces or preventing them from sticking during melting.

U.S. Pat. No. 5,795,613 concerns nonpuffed dried cheese pieces of nonmelting cheese made by drying nonmelting cheese pieces to a final moisture content, preferably between 2 and 8 percent, by dielectric heating, (e.g., microwave heating).

U.S. Pat. No. 4,997,670 concerns a method of baking pizza from coated frozen cheese granules, in which cheese pieces are coated with cheese emulsifiers to promote melting and fusing of the cheese pieces during heating.

In spite of these and other efforts, there remains a need for shelf stable puffed cheese snack product which is low in carbohydrates and fat and having pleasant organoleptic properties. The present invention provides such a snack product.

SUMMARY OF THE INVENTION

The present invention provides a method for preparing a shelf-stable savory crispy puffed cheese product, said method comprising (1) providing low fat cheese precursor pieces containing about 12 to about 24 percent moisture and having surfaces, (2) contacting the surfaces of the low fat cheese precursor pieces with a polysaccharide to provide polysaccharide coated pieces, and (3) puffing the polysaccharide coated pieces to form the shelf-stable savory crispy puffed cheese product. Preferably the polysaccharide used to provide the polysaccharide coated pieces is in a powdered form.

The present invention also provides a method for preparing a shelf-stable savory crispy puffed cheese product, said method comprising (1) providing low fat cheese precursor pieces containing about 12 to about 24 percent moisture and having surfaces, (2) contacting the surfaces of the low fat cheese precursor pieces with a polysaccharide to provide polysaccharide coated pieces, (3) tempering the polysaccharide coated pieces in a moisture-tight environment for a period of at least about 4 hours and (4) puffing the tempered coated pieces to form the shelf-stable savory crispy puffed cheese product. Preferably the polysaccharide used to provide the polysaccharide coated pieces is in a powdered form.

The resulting snack food product comprises puffed cheese pieces having expanded, small cell structures which are essentially free of large voids and/or large blisters and which are essentially free flowing (i.e., do not stick tightly together or form clumps). Generally, the puffed cheese pieces are about 10 to about 40 mm in diameter.

It surprisingly has been found that, by coating the cheese precursor pieces with polysaccharide prior to rapidly cooking (i.e., puffing), the resulting puffed cheese pieces are essentially free flowing (i.e., free of stickiness to each other or to the lining of the puffing apparatus). Pieces that do stick together during puffing can be easily separated without damaging the desired shapes of the pieces. It also has been found that tempering the polysaccharide-coated cheese pieces in a moisture-sealed or moisture-tight container before the puffing step provides a more uniform matrix of small cells in the puffed product, thereby essentially avoiding the formation of large voids in the puffed pieces.

The resulting puffed, low fat or fat free, cheese crisp product provides a satisfying and satiating snack product having low calorie, low fat, low carbohydrate, and high protein content. The puffed high protein snack may be made from process cheese and cheese analogs similar to process cheese. Preferably, process cheese is used to prepare the puffed snack product. All the nutritional benefits and taste of cheese are provided in the form of a satisfying crunchy snack. For instance, the puffed cheese snack provides a savory source of protein and calcium.

DETAILED DESCRIPTION

Figure 1:
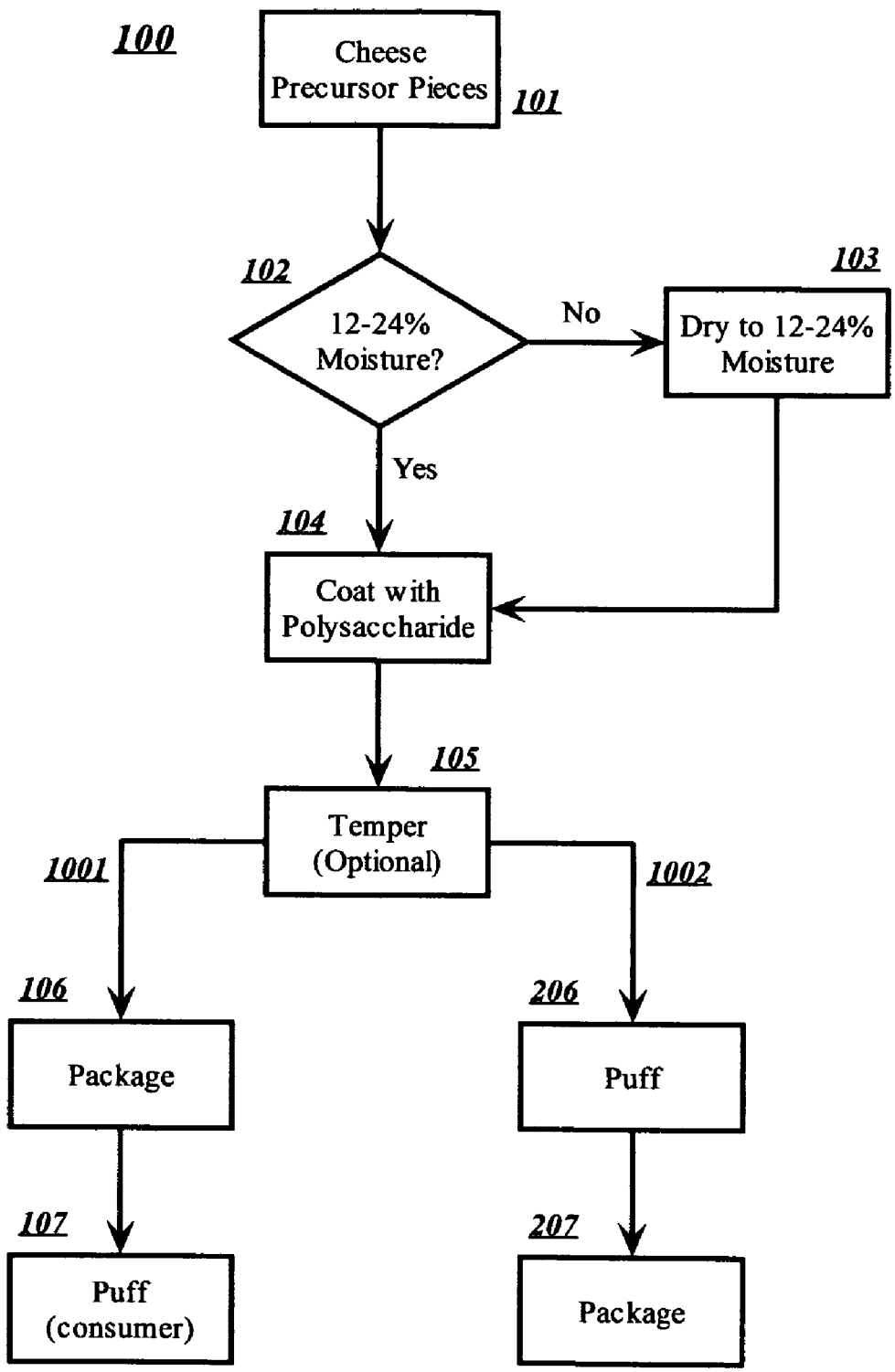
FIG. 1 is a flow chart of a process for making a dried, crisp, puffed cheese snack product according to an embodiment of the invention.

Referring to FIG. 1, a general process 100 is shown for making a dried, crisp, puffed cheese snack product. As shown, low fat cheese precursor pieces are provided having low moisture content (steps 101-103); the low moisture content cheese precursor pieces are surface-coated with polysaccharide (step 104); the coated cheese precursor pieces are optionally tempered (i.e., stored in a moisture-sealed environment or container) (step 105); and thereafter the non-tempered or tempered, coated cheese precursor pieces are either packaged and then puffed in situ by a consumer (end use 1001 comprising steps 106-107), or, alternatively, are puffed before packaging (end use 1002 comprising steps 206-207). Non-limiting illustrative details and aspects of these various process steps are described in more detail hereinafter.

Referring to step 101, the cheese precursor pieces are sourced from a cheese starting material selected from a process cheese or a cheese analog similar to process cheese. Process cheese is a cheese product that results from blending cheese ingredients such as comminuted cheeses (e.g., cheddar cheese) together with an emulsifier with the aid of mixing and heating to form a homogenous blend, and forming the blend into loaves, slices, or other convenient shapes. The cooling and molding processes useful for the process cheeses include those known in process cheese manufacturing. The process cheese may be, for example, American cheese, pasteurized American cheese, and similar cheese analogs thereof.

Suitable process cheese analogs may be prepared in conventional manners using combinations of various pre-isolated dairy protein sources, such as milk protein and/or whey protein, together with the emulsifier and optionally cheese to provide a dairy emulsion that can be cooked to form a cooked emulsion, and cooled to form a process cheese analog. The dairy emulsion and/or cooked emulsion may be homogenized. Homogenization can be accomplished using conventional techniques and equipment well known in food sciences.

The process cheese starter mix for process cheese or analogs thereof may optionally further include stabilizers, gums, caseinates, whey, lactic acid, or other functional additives or flavorings. However, the levels of fat sources, such as milk fats, which are sometimes included in such conventional processed cheese starter mixes, should be significantly limited in the embodiments of the present invention in order to provide enhanced puffed products. Suitable emulsifiers are well known in process cheese formulations. These emulsifiers include inorganic salts such as alkaline phosphates, alkaline or alkaline earth citrates, and alkaline tartrates. The emulsifier are generally present in the process cheese starter mix at a level of about 2 to about 5 percent.

In one embodiment, the cheese precursor pieces are formed from low fat process type cheese. For purposes herein, "low fat" can encompass "reduced-fat" or "no-fat" cheeses. In one aspect, the cheese precursor material is a cheese base having less than 10 percent fat content, particularly less than 5 percent fat, more particularly less than 2 percent fat, and even more particularly less than 0.5 percent fat. Among other advantages and benefits, it has been found that low fat process cheeses, and particularly process cheeses containing less than 0.5 percent fat, puff upon rapid heating into more expanded and crispier products than higher fat content process cheeses. Low fat versions of process cheeses can be provided, for example, by removing fat from the milk used in the make process used for manufacturing natural cheese(s), which in turn is used as an ingredient in the manufacture of the processed cheese.

In one aspect, a process cheese, or other processed cheese substrate material is cut into small pieces, preferably pieces sized to be convenient for being hand-held. Small pieces of cheese may be cut (or otherwise obtained) from blocks, slabs, or slices of process cheese. Such pieces have outer surface upon which the polysaccharide can be coated. In one aspect, the cheese precursor pieces are cut or otherwise formed into a structure having opposite faces and a generally uniform thickness. The thickness of the cheese precursor pieces should be thick enough to permit a dried crispy wafer to be formed upon rapid heat cooking, yet not so thin that the cheese burns easily if overcooked. Generally, the thickness will be about 2 to about 5 mm. The cheese precursor pieces may be provided in wafer-like, cube-like, or other shapes as well as mixed or non-uniform shapes.

In one aspect, the cheese precursor pieces have a substantially uniform thickness across the cheese piece of about 0.8 to about 8 mm, particularly about 1.5 to about 6 mm, and more particularly about 2 to about 5 mm. The desired thickness may depend upon the type of processed cheese and the amount of moisture in the cheese as well as the desired configuration of the puffed cheese product. For example, the type of process cheese and moisture affects the degree to which the matrix melts or softens prior to puffing. Generally it is desirable to have the matrix solid enough to hold the steam pressure inside before the matrix softens and expands. This allows control over the shape that results after the cheese has puffed. Higher moisture cheese may melt first, losing all definition of shape, and can actually become a runny puddle before the matrix dries enough to expand. In these cases, the expanded product will not be as puffy, but would be more like a blistered pancake. With a more melt-restricted matrix, higher moisture can be tolerated before puffing. In addition, if the pieces are very thin, the edges may dry out to a greater extent than the more central portions of the piece. If the edges dry out too much (i.e., such there is insufficient moisture retained in that portion of the cheese piece), those edges will not puff and will result in hard inedible spots. Pieces that are very thin or that have more exposed edges need to be kept at higher moisture (about 20 percent) prior to puffing. Additionally, the fat content, specific emulsifier salts, the type of base cheese (e.g., cheddar, mozzarella, and the like), optional dairy ingredients (e.g., dried whey, whey protein concentrate, milk powders, and the like), the amount of other non-cheese optional ingredients, and the like can all affect the melting properties of the process cheese, which in turn affect the amount of moisture that is desirable to have in the cheese piece prior to puffing. For a given of process cheese, one of ordinary skill in the art can determine suitable, including the optimum, process conditions using the guidance provided herein and routine experimentation.

The shape of the cheese precursor piece preferably is a size suitable for being hand-held or bite-sized. For example, the surface area of one face of a piece may be about 0.4 cm$^2$ (e.g., 0.25×0.25 inches) to about 105 cm$^2$ (e.g., 4×4 inches), particularly about 1.6 cm$^2$ (e.g., 0.5×0.5 inches) to about 26 cm$^2$ (e.g., 2×2 inches), and more particularly about 3.5 cm$^2$ (e.g., 0.75×0.75 inches) to about 10 cm$^2$ (e.g., 1.25×1.25 inches). The shape of a cheese piece may be symmetrical or non-symmetrical. Symmetrical wafer shapes include, for example, squares, stars, rectangles, circles, ovals, and so forth. The wafer shapes expand during puffing in a direction generally parallel to the thickness dimension and laterally outward from the peripheral edges. The original shape is generally maintained upon puffing, albeit as replicated with generally larger dimensions. Process cheese cubes also may be used. The cheese cubes tend to expand during puffing into more spherical-shaped products. Cheese precursor shapes having a relative flat major surface are preferred as they are more easily positioned in a relatively fixed position in, or on, a flat supporting surface during handling and processing. Spherical shaped cheese pieces also may be used, but they will tend to roll about and into each other if placed on a supporting surface that is moved unless the support surface is dimpled, such as similar to an egg carton tray, or otherwise contoured to help hold the cheese balls in place, which will increase packaging requirements. As discussed later, it is generally preferred that during puffing, the cheese precursor shapes are maintained in non-overlapping configurations.

Preferably, the cheese pieces are essentially free of structural defects such as cracks, crevices, or openings both internally and externally. Uniformity in physical structure of the cheese pieces helps to provide a more uniform release of steam from the piece during rapid heating used to puff the piece, which helps provide a more consistent and predictable product shape without undesirable formation of large voids.

The moisture content of the cheese material used as the starting material may be important from processability and product characteristic standpoints. For instance, full-fat pasteurized process cheeses and reduced fat pasteurized process cheeses typically have about 39 to about 43 percent and about 52 to about 58 percent moisture, respectively. However, in the practice of preferred embodiments herein, the moisture content thereof should be about 12 to about 24 percent, particularly about 16 to about 20 percent. "Moisture" refers to water content present in any physical state, such as water vapor and/or liquid water. Conventional processes, such as air drying or a drying oven, may be used to reduce the moisture of the cheese material to the desired level. The drying process is carried out below the melting temperature of the cheese material. The drying process also helps to case harden the surfaces of the cheese pieces, which assists in maintaining the shape of the pieces during the puffing process until enough steam press is built up internally to cause the cheese to puff.

This reduced moisture content makes the cheese base more "plastic-like" with a less rubbery-like texture. As a result, the reduced-moisture cheese precursor pieces can be handled, coated, tempered, and stored before being cooked without the different pieces sticking together at lower handling temperatures such as room temperature. If the moisture content of the cheese precursor is too low, some unpuffed cheese pieces may have unexpanded edge portions, as moisture tends to be more concentrated in central portions of the cheese pieces relative to the edge portions. Moisture content needs to concentrate enough to support expansion of the food matrix during a puffing step. If the moisture content is too high, the cheese material may scorch or burn from the heat associated with the larger volumes of vented steam.

Referring to step 103, if the original moisture content of the cheese precursor pieces exceeds the above-indicated desired moisture range values, the moisture levels preferably are reduced to the desired moisture range values before puffing by dehydrating the cheese. Partial dehydration of a cheese substrate can be accomplished in any convenient manner. For process cheese, the dehydrating temperature should be below the glass transition temperature of the cheese. The duration of heat application for partially dehydrating the cheese may vary depending on the original moisture content and the shape and size of the cheese pieces. For example, process cheese pieces of about 25×25×2 mm may be dehydrated from 45-50 percent to 16-20 percent moisture content by convective oven drying for about 3-5 hours using forced air continuously blown over the cheese pieces at about 40° C. Alternatively, the amount of moisture added to the cheese mixture during process cheese manufacture may be limited to help reduce the moisture content.

Flavorings, inlays, colorings, vitamins, minerals, and the like optionally may be added to the cheese substrate material during or after the manufacture of the process cheese, and/or during or after the manufacture of a natural cheese ingredient thereof. Flavorings include, for example, pizza flavorings, nacho flavorings, adobo flavorings, fajita flavorings, and so forth. Inlays, may include dried meat, vegetable, nuts, seeds, herbs, or fruit inlays or inclusions. For example, low fat turkey bacon inlays or other fat savory ingredients may be used. Seasonings also may be used to the pieces (so long as they do not adversely effect puffing if added before puffing, or by sprinkling them onto the dried puffed product). Even where flavorings or other additives are included in the cheese precursor pieces and/or are added onto the finished puffed product, the dried puffed cheese pieces generally contain at least about 90 percent processed cheese, particularly at least about 95 percent processed cheese, and more particularly at least about 98 percent processed cheese.

The overall composition of the processed cheese used to constitute the cheese precursor pieces may be in the following range, allowing for other wholesome foods and/or food additives to be added to the cheese base:

|  | Amount (%) | Preferred Amount (%) |
| --- | --- | --- |
| Moisture | 12-24 | 16-20 |
| Fat | 0-20 | 1-10 |
| Protein | 20-70 | 30-50 |
| Carbohydrate | 5-30 | 15-25 |
| Mineral | 5-20 | 5-14 |

As shown in step 104, the low moisture cheese precursor pieces are surface coated with polysaccharide. The polysaccharide preferably is contacted and applied to both major faces of the cheese precursor pieces (i.e., the process wafers). The polysaccharide surface coating prevents tight adherence of cheese pieces which may be in close touching proximity to one another during a subsequent rapid heating procedure used for puffing them. It also prevents the cheese pieces from tightly adhering to a package or equipment surfaces during puffing, or other processing steps. To the extent the puffed pieces stick to each other or the container, they can be easily separated with a light force without damaging the shape of the piece(s).

The polysaccharide may be coated upon the faces of the cheese precursor piece continuously or discontinuously; however it should be applied in sufficient amounts and at sufficient surface locations to impart the antistick property across substantially all the surface area presented on each face of a cheese precursor piece. If applied discontinuously, preferably the polysaccharide is applied in a substantially regular pattern across each face of the cheese precursor piece. The manners available to apply the polysaccharide upon the faces of the cheese precursor pieces may vary depending on whether it is in flowable or granular form.

The polysaccharide may be, for example, cellulose or starch. The polysaccharide may be applied to surfaces of the cheese pieces as a solute in a flowable composition (e.g., to form a film), or, more preferably, in a fine granular or powdered form. Polysaccharides are polymers which can be derived from aldoses or ketoses by condensation polymerization, in which a plurality of monosaccharide units are held together by glycoside linkages, which can be broken down by hydrolysis. Cellulose and starch are exemplary polysaccharides for purposes of embodiments herein. Both may be represented by the formula $(C_6H_{10}O_5)_n$, although they have different structures. Cellulose, like starch, generally is made up of chains of D-glucose units, each unit joined by a glycoside linkage to C-4 of the next. Cellulose differs from starch, however, in the configuration of the glycoside linkage. As generally understood, the glycoside linkages in cellulose are beta linkages, as opposed of alpha glycoside linkages in starch.

The cellulose may be alkyl cellulose, such as methyl cellulose, a carboxymethylcellulose or alkali salt thereof, or crystalline cellulose. The methyl celluloses can be commercially obtained as gums in flowable form. Such flowable cellulose materials may be applied onto the major faces of the cheese pieces by any convenient method, such as, for example, tumble drum, vibrating conveyor belt, electrostatic coating, and/or similar processes. The cellulose also may be a combination of different types of cellulose, such as a colloidal-forming attrited mixture of microcrystalline cellulose and sodium carboxymethylcellulose. Generally such cellulose compositions may be applied to both major faces of the cheese precursor pieces at a surface coating rate of about 1 to about 12 mg/cm², particularly about 1 to about 6 mg/cm².

The starch may be an edible starch such as corn starch, tapioca starch, dextrin, potato starch, rice starch, and the likes as well as combinations thereof. In plants, starch is a reserve carbohydrate polymer, deposited as granules in the seeds, tubers, or roots. In their native state, starch granules from various plant sources differ in size, shape, amylose content, and gelatinization temperature. Native corn starches, for example, may be obtained from waxy maize corn starch or common corn starch. Native corn starch granules, for instance, are often about 5 to about 20 microns in size and have round to polygonal shapes, although they are not limited thereto. Corn starch may be obtained by grinding the white hearts of corn kernels into a silken powder; common corn starches (about 20 percent amylose and about 75 percent amylopectin) or high amylose corn starches (about 50 to about 75 percent amylose and about 25 to about 50 percent amylopectin) may be used. High amylose corn starch is more resistant to gelation, requiring higher temperatures and moisture to hydrate and gelatininze the granules.

The starch is typically applied to both faces of the cheese precursor pieces in fine granular or powdered form. For example, using a batch mode, the starch may be applied by sprinkling the starch granules upon face of the cheese precursor pieces at a substantially constant application rate. The cheese precursor pieces may be lightly flipped over so that each face receives a sprinkling of the starch. Alternatively, a starch coating can be applied onto a nonstick surface (e.g., a TEFLON® surface or wax paper), upon which the lower face of a cheese precursor pieces is placed and picks up starch granules, and the upper face of the cheese precursor pieces received a sprinkling of the starch. Of course, for commercial use, a semi-continuous or continuous process would be preferred. For example, tumble drum and conveyor-based methods, used alone or in conjunction with electrostatic methods to achieve even distribution of the starch, may be used.

The starch granules sufficiently adhere to the faces of the cheese precursor material when contacted thereto at room temperature to stay substantially retained thereon through subsequent handling including puffing. The granular starch coatings may be applied to major faces of the cheese precursor pieces at a surface coating rate of about 2 to about 20 mg/cm², particularly about 4 to about 12 mg/cm².

Preferably, the polysaccharide is applied just before the puffing step or just before the tempering step (if used). Referring to step 105, after being surface coated with polysaccharide, the coated cheese precursor pieces are optionally tempered. For purposes herein, "tempering" refers to a holding period during which the cheese pieces are held at approximately room temperature in an enclosed moisture-retaining container or environment for about four (4) to about twenty-four (24) hours, particularly about eight (8) to about sixteen (16) hours. For purposes of this invention, "moisture-retaining" is intended to mean an environment in which exchange of moisture with the outside is substantially reduced or preferably substantially eliminated.

The cheese pieces that have been tempered for a sufficient period of time have a more uniform cellular structure upon puffing. It is believed that the tempering step, in addition to allowing time for equilibration of the moisture within the cheese pieces, acts to case-harden or "anneal" the protein matrix before subsequent puffing, and thereby assists in retaining the shape throughout the microwave puffing process. The coated cheese pieces are held long enough in the moisture-sealing container for this annealing affect to be imparted. At that point, longer periods of tempering give little further benefit, if any. Tempering the polysaccharide-coated cheese pieces before puffing also permits a more uniform matrix of smaller cells to form in the puffed product, and avoids large bubbles or gaps in the central areas of the pieces. That is, tempering significantly reduces a balloon effect from occurring in the cheese pieces during puffing, in which steam in the central region of the cheese pieces collects into a bubble, forming an irregular nonsymmetrical food product having a large air void in the central area. Tempering also helps to control the initial melt of the cheese during puffing, such that shapes of the cheese pieces can be better preserved during puffing.

As previously indicated, after tempering, the coated cheese precursor pieces may be packaged for distribution and sales to consumers who may freshly puff the pieces at their convenience using a rapid heating device, such as a conventional microwave oven, in their home or workplace (steps 106-107). For this mode of use, the tempered cheese precursor pieces may be packaged in a receptacle or container which includes a tray or plate which can support the pieces during shipping, handling, and puffing. The tempered, coated cheese precursor pieces may be packaged in a manner restricting the entry of moisture and oxygen to ensure the freshness and shelf stability of the product until puffed.

In one aspect, the cheese precursor pieces are packed in a manner which minimizes contacts between different pieces at their peripheral edges and avoids overlapping pieces, and more preferably substantially all pieces are arranged in a non-touching orientation. The cheese precursor pieces may be packed in such manners with appropriate packaging methods, such as via shrink-wrap or vacuum packaging with a thin flexible plastic cover wrap tightly draped upon the pieces as supported in a container tray. The tray is covered with a covering or lid that can be removed or stripped from the tray without substantially disturbing the positions of the food pieces, so that the pieces can be rapidly heated for puffing them in an open condition to the surrounding atmosphere.

It has been found important to permit substantially unimpaired venting of steam generated during rapid heating used to puff the cheese precursor pieces, as discussed in more detail below. The cheese pieces optionally may be coated with a seasoning mix before packaging. The cheese precursor pieces can be packaged in convenient snack size amounts, such as one to four ounces (28 to 112 g) per container, or other amounts.

Referring to rapid heating steps 107 and 206, the tempered cheese precursor material is rapidly heated to effectively puff the cheese precursor pieces. For purposes herein, a "puffed" food product refers to a food product that rises at least about 20 percent over a predominance (preferably at least 50 percent) of at least one major face thereof relative to its original thickness dimension prior to puffing.

The puffs are formed primarily by the vaporization of moisture in the product, followed by softening of the cheese matrix. Rapid heating for puffing may be effected in several different ways, such as by heating them in a microwave oven, a convective oven, an impingement oven, or a combination oven (e.g., a convective and microwave heating oven).

In one aspect, the cheese precursor pieces may be puffed in a microwave oven uncovered, or with a microwave susceptor. In one mode of microwave puffing, the cheese pieces are placed substantially spread apart with minimized touching between each other at their respective peripheral edges in an open tray during microwave heating to facilitate controlled moisture release from the cheese pieces during microwave heating. This helps to prevent hot spots from occurring, which can lead to overheating and browning or burning.

To puff the cheese precursor pieces in a microwave oven or similar microwave heating system commonly used, for example, in homes or workplace break rooms and the like, the cheese precursor pieces may be placed in a microwave oven at about 400 to about 1500 watts for about 20 to about 40 seconds, particularly about 800 to about 1200 watts for about 25 to about 35 seconds, or until the cheese precursor pieces are puffed. Once puffed, the microwave heating should be promptly discontinued so that the puffed cheese product does not scorch or burn from overheating. If the cheese precursor pieces are not heated long enough, they tend to be unpuffed, and/or if puffed somewhat they tend to be overly chewy. If they are heated too long, the puffed cheese pieces can develop hot spots where they may burn or scorch.

The cheese precursor pieces may also be puffed as part of a commercial scale production line and then packaged (steps 206-207). A rapid heating system suitable for use in this regard is a continuous microwave oven, such as a microwave tunnel. Commercially available microwave tunnel systems may be used in this respect, such as a model MIP11 Cooking Line, made by Ferrite Co., Hudson, N.H. In one aspect, the low moisture cheese precursor pieces are arranged on a conveyor belt, such that they are not in overlapping contact with each other, and then passed through the oven at a controlled rate. In a pilot plant 6 foot tunnel oven (also made by Ferrite Co) operating at about 10 kW and a belt speed fo abut 100 in/min, cheese pieces remained within the oven for about 35 to about 60 seconds. Ovens having different powers and geometries will, of course, used different operating parameters. The belt that conveys the cheese pieces through the oven also may be a polytetrafluoroethylene- or TEFLON®-coated belt, to further help prevent the cheese precursor pieces from sticking to the conveyor belt.

Although microwave heating is illustrated herein, it will be appreciated that any form of dielectric heating may be used which permits rapid heating of foods. For example, in addition to microwave (10 GHz to 300 MHz) heating, radio frequency (300 to 3 MHz) heating also may be used.

Once puffed, the pieces may be immediately eaten, or they may be cooled and packaged for later consumption such as using conventional packing equipment for dried snack types of products. The puffed product preferably is packaged in an essentially moisture- and air-tight package.

Immediately after completing cooking of the cheese precursor pieces, the puffed cheese product generally have a moisture content below 12 percent, more particularly below about 8 percent, and more particularly below 2 percent. It will be appreciated that the moisture content of the puffed product may tend to increase after cooking if the puffed product is left exposed for a significant time to an ambient atmosphere with higher relative humidity.

The dried puffed cheese product pieces are crisp, but not brittle, crunchy, and chewable with a savory cheese flavor. The puffed cheese pieces made from wafer shaped precursors retain a wafer shaped, albeit a puffed up one, and remain essentially in one integral piece during handling before consumption. In addition, the finished puffed product preferably is substantially free of large air holes, gaps or voids in the food matrix.

As indicated, low fat, and especially fat-free (e.g., less than 0.5 percent fat), products are observed to be relatively more expanded and crispier than fat-containing cheese puffs. It is considered surprising that fat free processed cheese performs better than fat-containing cheese products. It has been discovered that the cheese protein matrix can soften even in the absence of fat. Since the fat-free cheese pieces are primarily protein, it would normally have been expected that cheese pieces would become sticky upon heating accompanying the puffing operation due to exposure of hydrophobic aminoacid residues in the fat-free or reduced fat cheese material. Comparative tests, described in the examples, have shown that use of standard emulsifiers, which are thought to block hydrophobic groups, instead of the polysaccharide coatings, did not impart antistick properties to the low fat, low moisture processed cheese precursor pieces upon rapidly heating them, as the emulsifiers either had no effect or made stickiness worse.

The examples that follow are intended to further illustrate, and not limit, embodiments in accordance with the invention. All percentages, ratios, parts, and amounts used and described herein are by weight unless indicated otherwise. All references cited herein are incorporated by reference.

EXAMPLE 1

For these experiments, cheese pieces were coated with starch or a commercially-available emulsifier before being puffed via rapid heating in a microwave oven.

Kraft Pasteurized American Fat Free Singles were cut into nine (9) pieces each (approximately 1 square inch (2.54×2.54 cm)). Eight slices of Fat Free Singles were used for each experimental variable. The 1 square inch pieces were pan coated by sprinkling with the coating (or in the case of lecithin, spraying on a commercial preparation, viz., PAM®), and then shaking and flipping the pieces on a baking pan. The coating rate was approximately 15 mg/cm² on each face of the cheese pieces.

Four coatings were investigated:
(1) sodium stearoyl-2-lactylate (EMPLEX® SSL, American Ingredients Co.);
(2) monoglyceride (PH300KA, Danisco); The emulsifier coatings (nos. 1-3) are included for comparison purposes only.
(3) lecithin dispersed in oil (PAM®, ConAgra Foods); and
(4) high amylose corn starch in combination with tapioca dextrin (CRISPI COAT UC, National Starch & Chemical Co.).

Samples were dried four (4) hours in a convection oven at 40° C., then tempered overnight at ambient temperature in a moisture-tight sealed plastic bag. Clumps of the coated pieces were placed on deli wax paper on a paper plate. The coated pieces were not spread apart, thus the peripheral edges of the pieces overlapped and were in contact with each other during puffing. The coated pieces for each test sample were covered with a microwave susceptor, yet remained open to the atmosphere to vent off steam during puffing, and were subjected to microwave energy for about 38 to 40 seconds in a microwave oven operating at 900 watts.

The following results were obtained:
(1) the comparative sodium stearoyl-2-lactylate coating did not work; all pieces stuck together;
(2) the comparative monoglyceride coating was only partially successful; although some pieces were separate, most remained in a tightly-adhered clump;
(3) the comparative lecithin coating failed; all pieces melted into a lump; and
(4) the invented starch coating worked very well; all pieces in the original clump could be completely separated by lightly teasing them apart without deforming or damaging them. It was also observed that there was excess starch on the bottom of the plate, and on the pieces.

EXAMPLE 2

A series of different samples of cheese precursor pieces were puffed after being coated with one of several different types of starches and tempered similar the protocol used in Example 1. In these tests, the coated, tempered cheese precursor pieces were arranged on a supporting surface during puffing such that some of the cheese pieces were separated from each other at their peripheral edges while others contacted or overlapped each other.

The coatings investigated were: high amylose corn starch (NOVELOSE 240, National Starch & Chemical Co.); low molecular weight dextrin (tapioca dextrin); a film forming modified starch (CRISPI FILM M, National Starch & Chemical Co.); high amylose corn starch in combination with tapioca dextrin (CRISPI COAT UC, National Starch & Chemical Co.); refined corn starch (MELOJEL, National Starch & Chemical Co.).

All starches were able to keep cheese pieces separate upon puffing, or allowed cheese to be easily teased apart. There was some light sticking between some contacting puffed cheese pieces, but those puffed cheese pieces were easily broken apart without breaking or damaging the individual pieces.

All of the starches gave large, well-defined expanded cheese pieces. High amylose corn starch (NOVELOSE 240) seemed to somewhat restrict the melt and puffing so that the pieces were somewhat smaller than with the other starches; nonetheless, all starches provided high quality snack products.

EXAMPLE 3

Experiments were conducted in which cheese pieces were coated with cellulose as the polysaccharide coating. A similar testing process as used in Example 2 was performed. The tested coatings were microcrystalline cellulose (AVICEL RC581A, FMC Corporation) and methylcellulose (METHOCEL A4M, Dow Chemical, Midland, Mich.).

Separate batches of cheese pieces were coated with each type of cellulose, and were dried in a moisture-tight plastic bag overnight. About 28 g of the coated, tempered cheese pieces were placed on plate and microwaved for 38 seconds at 900 watts. All pieces puffed and were completely separated. The pieces seemed to blow apart while puffing. The blown apart puffed pieces were generally uniform in shape (i.e., small pillows).

A comparison sample of cheese pieces was prepared in which the cheese pieces were not coated with polysaccharide.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A method for producing a shelf-stable savory crispy puffed cheese product, said method comprising (1) providing low fat cheese precursor pieces containing about 12 to about 24 percent moisture and having surfaces, (2) contacting the surfaces of the low fat cheese precursor pieces with a powdered polysaccharide to provide polysaccharide coated pieces, (3) tempering the polysaccharide coated pieces in a moisture sealed environment, and (4) puffing the polysaccharide coated pieces to form the shelf-stable savory crispy puffed cheese product.

2. The method according to claim 1, wherein the low fat cheese precursor pieces comprise discrete process cheese pieces.

3. The method according to claim 2, wherein the discrete process cheese pieces have substantially uniform thickness.

4. The method according to claim 3, wherein the substantially uniform thickness is between about 2 to about 5 mm.

5. The method according to claim 1, wherein the low fat cheese precursor pieces contain less than about 2 percent fat.

6. The method according to claim 5, wherein the low fat cheese precursor pieces contain less than about 0.5 percent fat.

7. The method according to claim 1, wherein the low fat cheese precursor pieces contain about 12 to about 24 percent moisture.

8. The method according to claim 7, wherein the low fat cheese precursor pieces contain about 16 to about 20 percent moisture.

9. The method according to claim 1, wherein the puffing is carried out using microwave heating, convective heating, impingement heating, or a combination thereof.

10. The method according to claim 9, wherein the polysaccharide coated pieces are supported substantially without overlapping one another during puffing.

11. The method according to claim 1, wherein powdered polysaccharide is selected from the group consisting of starch, cellulose, and mixtures thereof, wherein the puffing is carried out using microwave heating, and wherein the shelf-stable savory crispy puffed cheese product has a moisture content of less than about 8 percent.

12. The method according to claim 1, wherein the tempering comprises holding the polysaccharide coated pieces in the moisture sealed environment for about 8 to about 24 hours at about 40 to about 80° F.

13. A method for producing a shelf-stable savory crispy puffed cheese product, said method comprising (1) providing low fat cheese precursor pieces containing about 12 to about 24 percent moisture and less than about 2 percent fat and having surfaces, (2) contacting the surfaces of the low fat cheese precursor pieces with a powdered polysaccharide to provide polysaccharide coated pieces, (3) tempering the polysaccharide coated pieces in a moisture sealed environment, (4) arranging the tempered polysaccharide coated pieces on a supporting surface wherein the tempered polysaccharide coated pieces are substantially non-overlapping, and (5) puffing the substantially non-overlapping pieces on the supporting surface to form the shelf-stable savory crispy puffed cheese product.

14. The method according to claim 13 further comprising packaging the shelf-stable savory crispy puffed cheese product.

15. The method according to claim 13 further comprising packaging the substantially non-overlapping pieces on the supporting surface from step (4), whereby a consumer can carry out step (5) to prepare the shelf-stable savory crispy puffed cheese product prior to consumption.

16. The method according to claim 14, wherein the precursor pieces comprise discrete process cheese pieces containing less than about 0.5 percent fat and having a substantially uniform thickness of about 2 to about 5 mm and wherein the shelf-stable savory crispy puffed cheese product has a moisture content of less than about 8 percent.

17. The method according to claim 15, wherein the precursor pieces comprise discrete process cheese pieces containing less than about 0.5 percent fat and having a substantially uniform thickness of about 2 to about 5 mm and wherein the shelf-stable savory crispy puffed cheese product has a moisture content of less than about 8 percent.

18. The method according to claim 16, wherein polysaccharide is selected from the group consisting of starch, cellulose, and mixtures thereof, wherein the tempering comprises holding the polysaccharide coated pieces in the moisture sealed environment for about 8 to about 24 hours at about 40 to about 80° F., and wherein the puffing is carried out using microwave heating.

19. The method according to claim 17, wherein polysaccharide is selected from the group consisting of starch, cellulose, and mixtures thereof, wherein the tempering comprises holding the polysaccharide coated pieces in the moisture sealed environment for about 8 to about 24 hours at about 40 to about 80° F., and wherein the puffing is carried out using microwave heating.

* * * * *